(No Model.)

A. JOHNSTON.
MEANS FOR SECURING ATTACHMENTS TO SEWING MACHINES.

No. 592,008. Patented Oct. 19, 1897.

Witnesses.
W. R. Edelin.

Inventor
Alan Johnston
by his attorneys

UNITED STATES PATENT OFFICE.

ALLEN JOHNSTON, OF OTTUMWA, IOWA.

MEANS FOR SECURING ATTACHMENTS TO SEWING-MACHINES.

SPECIFICATION forming part of Letters Patent No. 592,008, dated October 19, 1897.

Application filed February 19, 1897. Serial No. 624,220. (No model.)

*To all whom it may concern:*

Be it known that I, ALLEN JOHNSTON, of Ottumwa, Iowa, have invented a new and useful Improvement in Means for Securing Attachments to Sewing-Machines, which improvement is fully set forth in the following specification.

The present invention has reference to specific devices designed more particularly for securing a removable part or attachment of a sewing-machine to the presser-bar thereof.

The invention consists of an arrangement of interlocking lugs or projections and recesses arranged on the respective parts to be connected, and suitable clamping means for rigidly holding the parts together after the projections and recesses have been brought into proper engagement.

The invention will be better understood by reference to the accompanying drawings, forming part of this specification, wherein I have illustrated the invention as applied for connecting the presser-bar and presser-foot of a sewing-machine, and in which—

Figure 1:
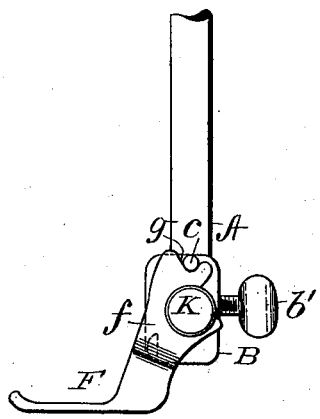
Figure 2:
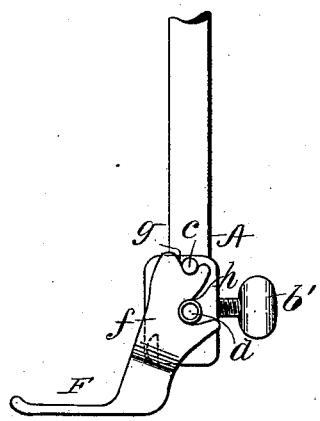
Figure 3:
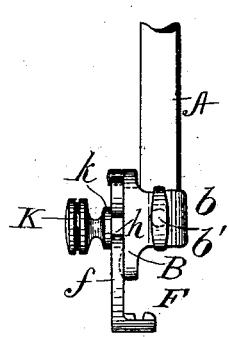
Figure 4:
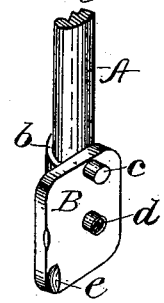
Figure 5:

Figure 1 is an elevation showing the parts connected. Fig. 2 is a similar view with the clamping-screw removed. Fig. 3 is an elevation at right angles to Fig. 1. Fig. 4 is a view of the plate on the presser-bar, and Fig. 5 is an elevation of the presser-foot from the side that is clamped against the plate on the presser-bar.

In the drawings, A represents the presser-bar of a sewing-machine. B is a plate having a hollow cylindrical projection $b$ thereon, into which the lower end of bar A projects and is secured by set-screw $b'$. Plate B has on its flat face three projections—an upper cylindrical projection $c$, a central, hollow, interiorly-screw-threaded projection $d$, and a lower projection or tooth $e$.

F is a presser-foot, having thereon an upward extension $f$ in the form of a flat plate having formed therein three recesses or depressions—to wit, a vertical recess $g$ in the upper edge of said plate, a horizontal recess $h$ in one side of the plate, beneath which a horn $h'$ projects from the plate and acts as a guide in bringing the parts together, and a recess or notch $i$ on the face of plate F adjacent to plate B, said recesses $g$, $h$, and $i$ corresponding to and engaging and interlocking with projections $c$, $d$, and $e$, respectively.

K is a clamping-screw engaging the threaded opening in projection $d$ and having a flange $k$ thereon, which, as the screw is turned, is forced down against the plate F and secures the same tightly against the plate B. In bringing the parts together the recess $g$ is first engaged with the projection $c$, on which the presser-foot is then turned as a pivot until projection $d$ strikes against the bottom of recess $h$, at which instant the recess $i$ drops over projection $e$, thus locking the parts against movement in the plane of the projections. Screw K is now manipulated to clamp the parts together, thereby effecting an absolutely rigid connection.

The location of the projections and recesses can, of course, be reversed and other modifications made without departing from the nature and principle of the invention.

Having thus described my invention, what I claim as new, and desire to secure by Letters Patent, is—

1. The combination with the presser-bar and a plate carried thereby having three projections on the face thereof, of a presser-foot or similar attachment having an extension thereon, said extension being formed with three recesses or depressions therein adapted to engage respectively with the projections on the plate, two of said recesses being in the edge of the extension and the third in the flat face thereof, and means for clamping the parts together so that upon loosening said clamping means the parts can be separated, substantially as described.

2. The combination with the presser-bar and a plate having a flat face carried thereby, and three projections on the flat face of said plate, one of said projections being hollow and interiorly screw-threaded, of a presser-foot or similar device having an extension thereon formed with a flat face, said extension having two recesses in the edge thereof, and a third recess in its flat face, said recesses being adapted to receive the projections on the presser-bar plate, and a screw engaging the interiorly-threaded projection and acting to clamp the parts together, substantially as described.

In testimony whereof I have signed this specification in the presence of two subscribing witnesses.

ALLEN JOHNSTON.

Witnesses:
J. T. HACKWORTH,
G. BINKS.